United States Patent
Mason

(10) Patent No.: US 8,311,942 B1
(45) Date of Patent: Nov. 13, 2012

(54) METHOD AND SYSTEM FOR PAYMENT OF A BILL

(75) Inventor: Gary Stuart Mason, Simi Valley, CA (US)

(73) Assignee: Intuit Inc., Mountain View, CA (US)

( * ) Notice: Subject to any disclaimer, the term of this patent is extended or adjusted under 35 U.S.C. 154(b) by 42 days.

(21) Appl. No.: 12/910,733

(22) Filed: Oct. 22, 2010

(51) Int. Cl.
*G06F 17/00* (2006.01)

(52) U.S. Cl. .............................. 705/40; 705/34; 705/42

(58) Field of Classification Search ............... 705/34, 705/40, 42
See application file for complete search history.

(56) References Cited

U.S. PATENT DOCUMENTS

| | | | |
|---|---|---|---|
| 7,627,527 B1 * | 12/2009 | Hildebrand | 705/39 |
| 8,078,986 B1 * | 12/2011 | Rhyne et al. | 715/789 |
| 2001/0037315 A1 * | 11/2001 | Saliba et al. | 705/70 |
| 2003/0177090 A1 * | 9/2003 | Eden | 705/40 |
| 2005/0033690 A1 * | 2/2005 | Antognini et al. | 705/40 |
| 2005/0060261 A1 * | 3/2005 | Remington et al. | 705/40 |
| 2008/0010193 A1 * | 1/2008 | Rackley, III et al. | 705/39 |
| 2008/0243657 A1 * | 10/2008 | Voysey | 705/34 |
| 2009/0271303 A1 * | 10/2009 | Weng et al. | 705/34 |

OTHER PUBLICATIONS

"How do you detect objects for Yahoo! Shortcuts?", Aug. 31, 2010, www.help.yahoo.com (1 page).
"Why are some words underlined in my email?", Aug. 31, 2010, www.help.yahoo.com, (1 page).

* cited by examiner

*Primary Examiner* — Tien Nguyen
(74) *Attorney, Agent, or Firm* — Osha Liang LLP

(57) ABSTRACT

A method for paying a bill includes receiving a bill notification email directed to a user, scanning the bill notification email to gather, from the bill notification email, bill information that includes a billed amount and a biller identifier, generating a network protocol request referencing a bill payment service and that includes the bill information, and augmenting the bill notification email with a selectable interface component that includes the network protocol request to create a modified bill notification email. The method further includes presenting the modified bill notification email to the user, receiving a selection of the selectable interface component, extracting the bill information from the network protocol request based on the selection to obtain extracted bill information, and paying the bill using the extracted bill information by paying the billed amount to the biller identified by the biller identifier using a financial account of the user.

19 Claims, 8 Drawing Sheets

400
Bill Notification Email from Biller

---

Re: Customer Account Number: 9-99-999-9999

Dear Valued SCE Customer,

Your current bill for SCE customer account number 9-99-999-9999 is available now for viewing with SCE's Online Billing at My Account. The total amount due on this statement is $356.77. Your current charges are now due and considered to be past due if not paid by 09/13/2010. As a benefit of enrolling in SCE's Online Billing Service, you will receive this email notification every time a bill is generated.
View the current issue of Customer Connection.
Thank you.

402
Modified Bill Notification Email

---

Re: Customer Account Number: 9-99-999-9999

Dear Valued SCE Customer,

Your current bill for SCE customer account number 9-99-999-9999 is available now for viewing with SCE's Online Billing at My Account. The total amount due on this statement is $356.77. Your current charges are now due and considered to be past due if not paid by 09/13/2010. As a benefit of enrolling in SCE's Online Billing Service, you will receive this email notification every time a bill is generated.
View the current issue of Customer Connection.
Thank you.

( PAY THIS BILL )

---

404
Selectable Interface Component

*FIG. 6B*

410
Authentication Interface

UserID: John Smith
Password: xxxxxxxxx

Logon

*FIG. 6C*

412
Single Bill Interface

Payee: SCE
Due: 9/13/2010
Amount: 356.77

Confirm

*FIG. 6D*

414
List of Bills Interface

| Payee | Due | Amount |
|---|---|---|
| SCE | 9/13/2010 | 356.77 |
| AT&T | 9/24/2010 | 145.34 |

Confirm

*FIG. 6E*

METHOD AND SYSTEM FOR PAYMENT OF A BILL

BACKGROUND

Before the Internet, the typical method to pay a bill from a business was to go to the physical location of the business and pay the bill, call the business to pay the bill, or mail the payment to the business. Since the proliferation of the Internet, many businesses (e.g., Energy companies, Cable companies, Internet Service Providers, Credit Card companies, etc.) now offer customers the ability to pay the bill via the Internet. Customers may use different methods to pay their bills.

One method for a customer to pay their bill is for the customer to use an online account maintained by the business. Specifically, the customer may login to their the business maintained online account, submit credit or debit card information to the business maintained online account, and authorize the business to debit the account associated with the credit or debit card. Using this method, the customer remembers the login information for each online account of the different business with whom the customer transacts.

Rather than using the online account of the business, a customer may access their online account maintained by their financial institution. To pay a bill using the customer's online account maintained by their financial institution, the customer submits payment information including typing in the account number of the customer's account with the business. The financial institution then transfers the amount to the business with the account number of the customer's account with the business.

Some businesses may send out reminders to their customers when a bill is due. The reminder may be in the form of an email notification to the customer's email account. In general, the email only includes basic information about the bill.

SUMMARY

In general, in one aspect, the invention relates to a method for paying a bill. The method includes receiving a bill notification email directed to a user, scanning the bill notification email to gather, from the bill notification email, bill information that includes a billed amount and a biller identifier, generating a network protocol request referencing a bill payment service and that includes the bill information, and augmenting the bill notification email with a selectable interface component that includes the network protocol request to create a modified bill notification email. The method further includes presenting the modified bill notification email to the user, receiving a selection of the selectable interface component, extracting, by the bill payment service, the bill information from the network protocol request based on the selection to obtain extracted bill information, and paying the bill using the extracted bill information by paying the billed amount to the biller identified by the biller identifier using a financial account of the user.

In general, in one aspect, the invention relates to a method for paying a bill, that includes receiving a bill notification email from a biller directed to a user, scanning the bill notification email to gather, from the bill notification email, bill information that includes a billed amount and a biller identifier, obtaining, based on the user identified in the bill notification email, financial account information identifying a financial account corresponding to the user, and paying the bill by paying the billed amount to the biller identified by the biller identifier using the financial account of the user.

In general, in one aspect, the invention relates to a system for paying a bill, that includes a computer processor, a data repository that includes a financial account for a user, and a bill payment widget executing on the computer processor. The bill payment widget includes functionality to receive a bill notification email directed to a user, scan the bill notification email to gather, from the bill notification email, bill information referencing a bill payment service and that includes a billed amount and a biller identifier, generate a network protocol request that includes the bill information, and augment the bill notification email with a selectable interface component that includes the network protocol request to create a modified bill notification email. The bill payment widget further includes functionality to present the modified bill notification email to the user. The bill is paid by the bill payment service using the financial account based on a selection of the selectable interface component in the modified bill notification email.

In general, in one aspect, the invention relates to a computer readable storage medium that includes computer readable program code embodied therein for causing a computer system to perform a method for payment of a bill. The method includes receiving a bill notification email directed to a user, scanning the bill notification email to gather, from the bill notification email, bill information that includes a billed amount and a biller identifier, generating a network protocol request referencing a bill payment service and that includes the bill information, and augment the bill notification email with a selectable interface component that includes the network protocol request to create a modified bill notification email. The method further includes presenting the modified bill notification email to the user. According to a selection of the selectable interface component, the bill is paid by the bill payment service by paying the billed amount to the biller identified by the biller identifier using a financial account of the user.

In general, in one aspect, the invention relates to a computer readable storage medium that includes computer readable program code embodied therein for causing a computer system to perform a method for payment of a bill. The method includes receiving a bill notification email directed from a biller to a user, scanning the bill notification email to gather, from the bill notification email, bill information that includes a billed amount and a biller identifier, and obtaining, based on the user identified in the bill notification email, financial account information identifying a financial account corresponding to the user. The bill is paid by paying the billed amount to the biller identified by the biller identifier using the financial account of the user.

Other aspects of the invention will be apparent from the following description and the appended claims.

BRIEF DESCRIPTION OF DRAWINGS

FIGS. 6A-6E show an example in accordance with one or more embodiments of the invention.

DETAILED DESCRIPTION

Figure 1:
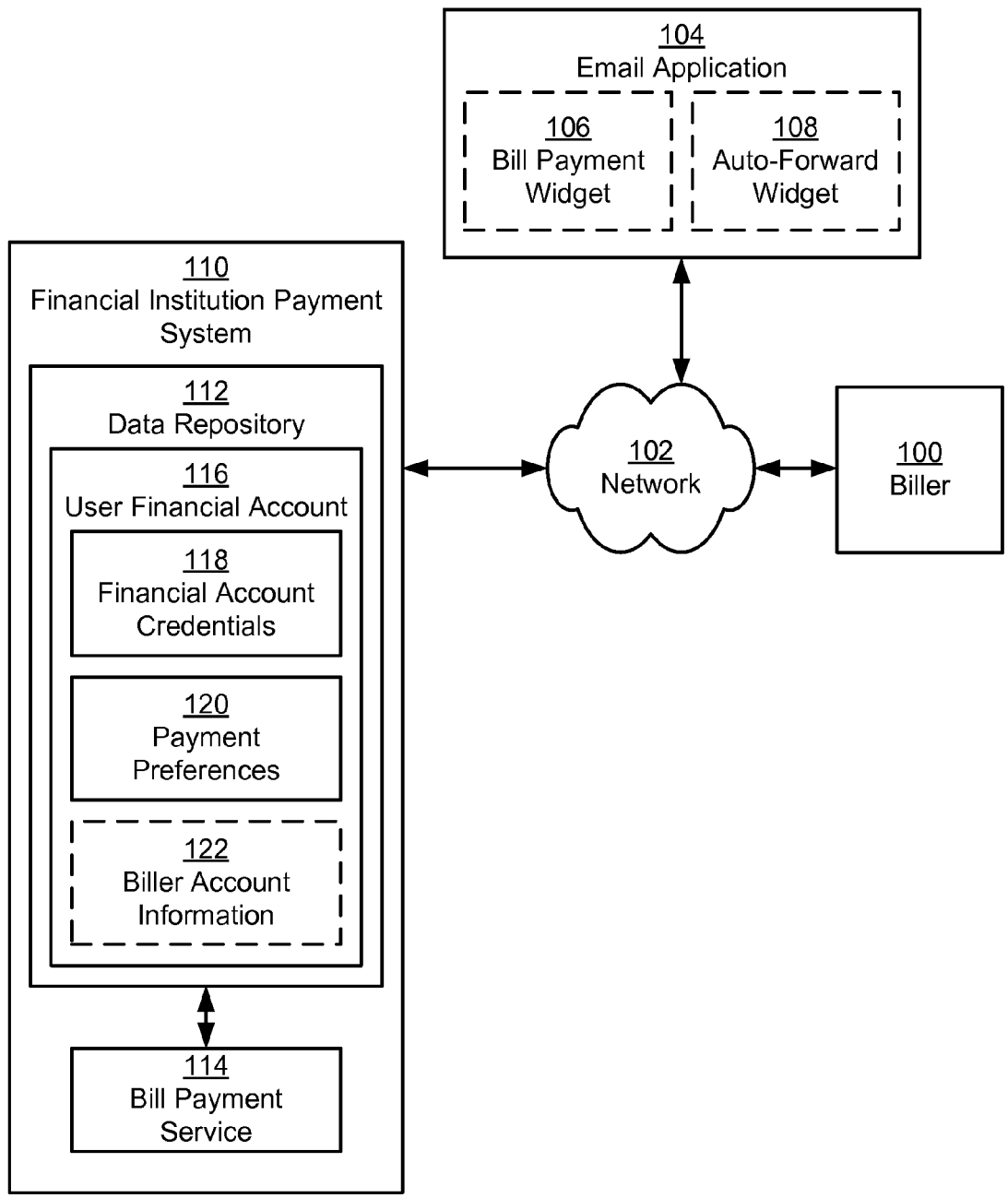
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for paying bills based on bill notification emails. A bill notification email is an email from the biller sent to the user's email account that notifies the user of the existence of a bill from the biller. The user's email account may receive and therefore include bill notification emails intermixed with irrelevant emails. An irrelevant email is any email that is not a bill notification email. For example, irrelevant emails include business related emails, personal emails (e.g., from friends), advertisements, spam emails, newsletters, any other type of email. Embodiments of the invention identify, from the user's emails, which emails are bill notification emails. When bill notification email is identified, bill information including a payment amount and the biller identifier are obtained from the bill notification email. Using the payment amount and the biller identifier extracted from the bill notification email, the bill is paid for the user.

In one or more embodiments of the invention, the payment amount and biller information is embedded into a network protocol request. The network protocol request may correspond to a hypertext transfer protocol (http) request, a secure shell (ssh) request, or another request based on a network protocol. As used herein, an http request includes requests made using http and https. The network protocol request is added to a selectable interface component, such as a graphical user interface (GUI) button, a web address link, or another such component that the user may select. When a selection is received, the network protocol request links to the user's financial account. In one or more embodiments of the invention, bill payment service associated with the user's account extracts the bill information from the network protocol request, and pays the bill from the user's financial account.

In one or more embodiments of the invention, rather than using a selectable interface component, the bill may be paid for the user without using the selectable interface component. For example, in one or more embodiments of the invention, the email may be automatically forwarded to the user's financial institution. The user's financial institution may extract the bill information from the bill notification email and pay the bill or add the bill to a list of bills for the user's payment in one or more embodiments of the invention.

FIG. 1 shows a schematic diagram of a system in accordance with one or more embodiments of the invention. As shown in FIG. 1, the system includes a biller (100), a network (102), an email application (104), and a financial institution payment system (110). Each of these components is discussed below.

In one or more embodiments of the invention, a biller (100) is any type of business entity. Specifically, the biller (100) may be a corporation, a partnership, a sole proprietorship, a non-profit organization, or any other type of entity. In one or more embodiments of the invention, the biller (100) provides a good or service to the user or to a third party. For example, if the biller (100) is a non-profit organization, the user may have pledged an amount to the biller (100) to provide the good or service to another. As another example, the biller (100) may be owed the amount based on goods or services that the biller (100) provided in the past or future to the user. In one or more embodiments of the invention, the biller (100) may provide a reoccurring good or service (e.g., electricity, television, etc.), require reoccurring payments (e.g., for a car loan, mortgage payment, etc.), or provide a one-time good or service and require a single payment (e.g., a repairman to repair a house).

In one or more embodiments of the invention, the biller (100) includes functionality to send a bill notification email to the user. Specifically, the biller's records includes an email address of an email account of the user. The biller (100) may send the bill notification email to the email account identified by the email address. As used herein, a biller (100) is deemed to send the bill notification email when an individual or entity sends the bill notification email on behalf of the biller (100) or when the biller (100) directly sends the bill notification email. For example, the biller (100) may use a billing service (not shown) to send the bill notification email and to collect payment.

In one or more embodiments of the invention, the bill notification email from the biller includes a billed amount and a biller identifier. The billed amount is the amount of money that the biller asserts is owed by the user. The biller identifier is any identification associated with the biller. For example, the biller identifier may be based on the domain of the return address of the bill notification email, a name of the biller located in the body of the bill notification email, or any other field used to identify the biller. The bill notification email may also include a due date specifying when payment is due to the biller, and an account number of an account managed by the biller for the user. The account managed by the biller for the user may be used, for example, to track the user's interaction with the biller. For example, the records in the account may include the amount of goods or services used or purchased, the payment due dates, dates when payments were received, past statements, contact information, discounts to the user, and any other information.

In addition to the above, the bill notification email from the biller provides a natural language discussion to the user about the bill. Specifically, the bill notification email may include one or more paragraphs having multiple sentences, where each sentence includes one or more of portions of bill information discussed above. For example, one sentence may state "The amount that you owe for the bill is $456.00." In the example, another sentence may state, "Please pay the amount by 9/30/2010 in order to avoid late charges."

Further, in one or more embodiments of the invention, bill notification emails from different billers may have different descriptive formats. A descriptive format is the collection and order of words used to convey the subject matter of the bill notification email. Specifically, a bill notification email from a biller (100) includes use of a specific set of words and a specific ordering of words to convey to the user that the bill notification email is a notification of the availability of a bill and a request for payment. For example, to specify the payment amount, the bill notification email from one biller may include the sentence "The amount that you owe is $82.00." while a bill notification email from another biller may have the sentence "Please pay fifty-two dollars prior to the due date of 30 September 2010." For a specific biller (100), the descriptive format may be according to an email template. Specifically, for each customer of the biller (100), the biller may populate the email template with the customer's specific information (e.g., account number, due date, billed amount, and other specific information).

Continuing with FIG. 1, the biller (100) is connected to a network (102). In one or more embodiments of the invention, a network (102) is a group of devices connected by communication channels (e.g., wired communication channels, wireless communication channels, or a combination thereof). For example, the network (102) may be a local area network (LAN), a wide area network (WAN) such as the Internet, or any other type of network.

In one or more embodiments of the invention, an email application (104) is connected to the network. The email application (104) may correspond to a client application, a server application, or a combination thereof. For example, the email application (104) may execute locally on a user's device. Alternatively, the email application (104) may execute on a server. In one or more embodiments of the invention, the email application (104) is configured to provide emails (e.g., bill notification emails, irrelevant emails) to the user. For example, if the email application is a server application, the email application (104) may include an internet-based GUI for allowing the user to view and manage emails from the user's email account. Additionally or alternatively, if the email application is a server application, the email application may be configured to transmit emails to a client email application executing on the user's device. In one or more embodiments of the invention, if the email application is a client application, the email application includes functionality to obtain emails from the user's email account and manage the user's emails by executing locally, on the user's device.

In one or more embodiments of the invention, regardless of whether the email application is a client application or a server application, the email application (104) optionally includes a bill payment widget (106) and/or an auto-forward widget (108). In one or more embodiments of the invention, the bill payment widget (106) and the auto-forward widget (108) is software code. In one or more embodiments of the invention, either or both widgets (e.g., bill payment widget (106), auto-forward widget (108)) may be a native component of the email application (104), an optional feature of the email application (104), a plug-in to the email application (104), or have another relationship with the email application.

In one or more embodiments of the invention, a bill payment widget (106) includes functionality to scan emails and determine whether the email is a bill notification email that includes sufficient bill information to pay the bill based on the bill notification email. Specifically, the bill payment widget (106) includes functionality to differentiate between irrelevant emails that are not bill notifications (e.g., emails from friends, family, colleagues, marketing departments, etc.) from bill notification emails.

In one or more embodiments of the invention, the bill payment widget (106) may include functionality to implement one or more modes for bill payment. If the bill payment widget (106) includes functionality to implement multiple modes, the current mode used by the bill payment widget may be set by user preferences.

In an email modification mode, the bill payment widget (106) includes functionality to generate the network protocol request from the bill notification email, and create a modified email by augmenting the bill notification email with a selectable interface component having the network protocol request.

In an automatic transfer mode, the bill payment widget (106) may include functionality to automatically, and without user intervention, transfer the bill information to the bill payment service (114) (discussed below). Specifically, the bill payment widget (106) includes functionality to extract the bill information from the bill notification email and send the bill information to the bill payment service (114). With the bill information, the bill payment service (114) may automatically pay the bill without user intervention. Alternatively or additionally, the bill payment service (114) may present the user will a collection of bills after the user logs into the user financial account (116).

In one or more embodiments of the invention, the auto-forward widget (108) includes functionality to forward emails directed to the user to the bill payment service. Specifically, the auto-forward widget (108) includes functionality to forward emails to an email address for an account accessed by the financial institution payment system (110). In one or more embodiments of the invention, each user associated with the financial account (116) has a separate email address accessed by the financial institution. Thus, the financial institution may distinguish between users according to the email address. Alternatively, the user may be identified in the body or subject of the email.

Continuing with the auto-forward widget (108), the auto-forward widget (108) may have configurable parameters for forwarding emails. For example, the auto-forward widget may be configured with the email address to forward emails.

Further, the auto-forward widget (108) may be configured to forward all emails directed to the user's email account, only the bill notification emails, or a subset thereof (e.g., bill notification emails having sufficient bill information).

Continuing with FIG. 1, the financial institution payment system (110) includes functionality to pay the bill for the user. The financial institution payment system (110) includes a data repository (112) and a bill payment service (114). The data repository (112) and the bill payment service (114) is discussed below.

In one or more embodiments of the invention, the data repository (112) is any type of storage unit and/or device (e.g., a file system, database, collection of tables, or any other storage mechanism) for storing data. Further, the data repository (112) may include multiple different storage units and/or devices. The multiple different storage units and/or devices may or may not be of the same type or located at the same physical site.

The data repository (112) includes one or more user financial accounts (116). A user financial account (116) is an account from which money may be transferred on behalf of a user. For example, user financial account (116) may be a checking account, a savings account, a credit card account, a credit account, or another such account. In one or more embodiments of the invention, the user financial account (116) includes financial account credentials (118), biller account information (122), and payment preferences (120).

In one or more embodiments of the invention, financial account credentials (118) include authentication and authorization credentials. Authentication credentials may be used to confirm the identity of the user. For example, the authentication credentials may include username and password, an authentication code, an account number and password, or any other data used to confirm the identity of the user. Authorization credentials may be used to define which portions of the user financial account (116) that the user may view and/or modify. For example, the authorization credentials may specify that the user may view their account balance but cannot modify their account balance. Similarly, authorization credentials may specify that the user may view and modify their contact information.

In one or more embodiments of the invention, payment preferences (106) provide preferences specified by the user to pay the bills. Specifically, the payment preferences may be selected from default payment options, bill presentment options, notification options, and other preferences. For example, the default payment options may allow a user to select whether to automatically pay the bill or wait for confirmation from the user, which account to use to pay the bill, whether to group bills into a list, and other such preferences.

In one or more embodiments of the invention, the biller account information (122) includes information about the account managed by the biller for the user. For example, the biller account information (122) may include the account number of the user's account managed by the biller, identification of requirements for payment to the biller (e.g., payment address, mode of payment, etc.), and any other information.

Continuing with the financial institution payment system (110), the bill payment service (114) includes functionality to pay the bill on behalf of the user using the user's financial account (116). In one or more embodiments of the invention, the bill payment service (114) includes functionality to extract the bill information from a network protocol request and use the extracted bill information with the user financial account (116) to pay the bill to the biller on behalf of the user. Alternatively or additionally, the bill payment service (114) may include functionality to receive forwarded emails from the auto-forward widget (108) in the email application (104), identify the user financial account (116) from the forwarded emails, scan and extract bill information from forwarded emails that are bill notification emails, pay the bill using the user financial account (110).

FIGS. 2-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
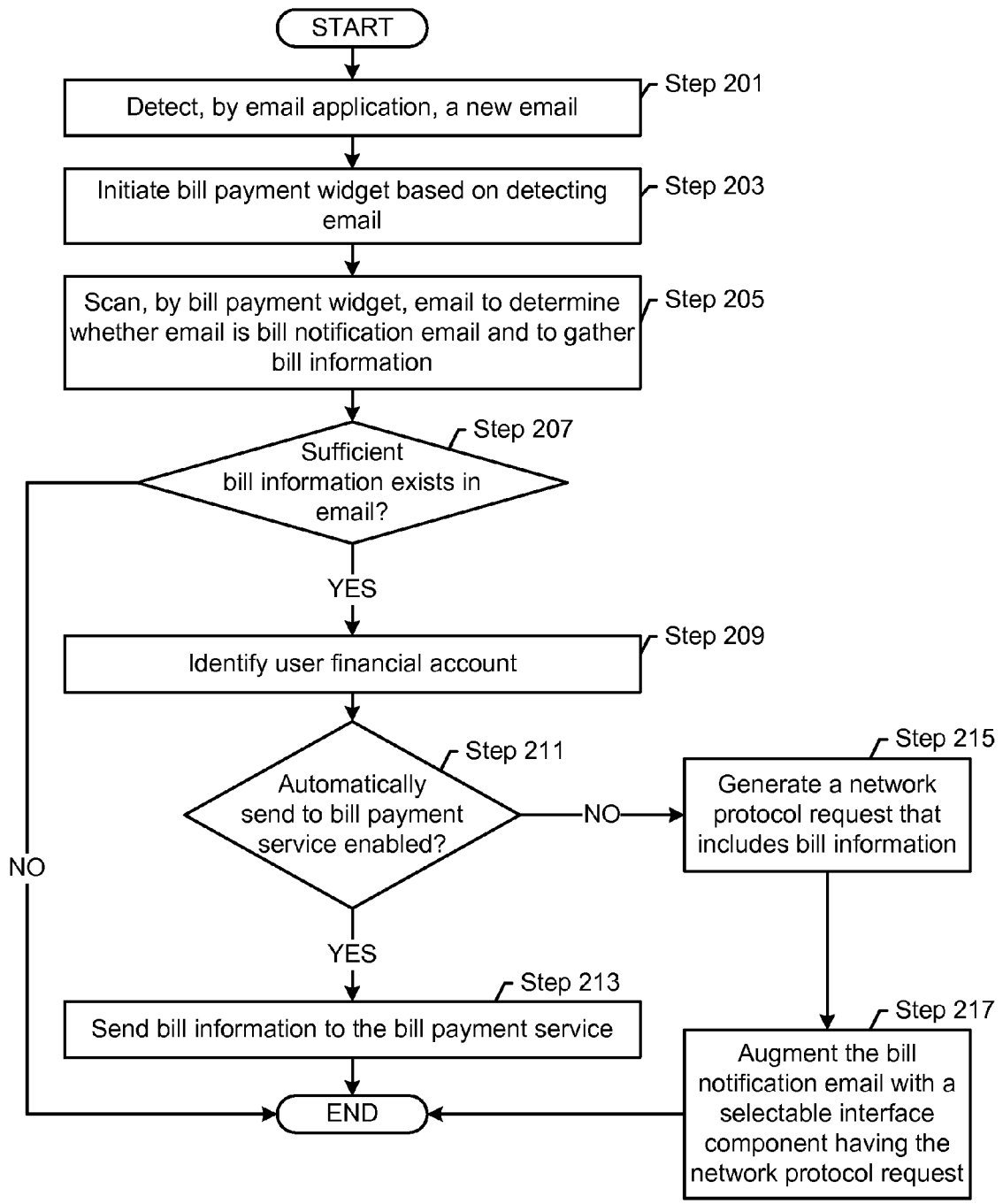
FIGS. 2-5 show flowcharts in accordance with one or more embodiments of the invention.

FIG. 2 shows a flowchart for the bill payment widget to facilitate the payment of the bill in one or more embodiments of the invention. In Step 201, an email application detects a new email. Specifically, a new email directed to the email address of the user is added to the email account. The new email may be an irrelevant email or a bill notification email. In response to detecting the new email, the email application initiates the bill payment widget in Step 203. Specifically, the email application starts the bill payment widget to process the email in one or more embodiments of the invention.

In Step 205, the bill payment widget scans the email to determine whether the email is a bill notification email and to gather the bill information from the email. One method for the bill payment widget to extract the bill information is to perform data scraping. Data scraping is a technique for extracting data from human-readable format. In one or more embodiments of the invention, the bill payment widget may use common keywords and key phrases to obtain the bill information. For example, when the bill payment widget identifies a phrase "due date" or "by" in the same sentence or adjacent to a common syntactical representation of a date (e.g., "9/24/2010", "September 24, 2010", "24 Sept 2010"), the bill payment widget may identify the date as the due date.

Similarly, in one or more embodiments of the invention, the bill payment widget may identify that a "$" or the word "dollar" adjacent to a number indicates that the number is the amount due. In one or more embodiments of the invention, to extract the biller identifier, the bill payment widget may compare the domain of the sender of the email, or words in the email with a list of possible billers. In one or more embodiments of the invention, the list of billers may be generated by a knowledgebase.

Another method for the bill payment widget to extract the bill information is to use a template defined for the particular biller. Specifically, each biller may have a form email that the biller sends to all of the biller's customers. The form email may be used to derive a template for the particular biller. The template may have static portions and dynamic portions. The static portions are the text that is generic to multiple customers of the biller. The dynamic portions includes the bill information that is specific to the particular customer. The template may be stored in a data repository of templates for billers. Accordingly, to extract the bill information, the biller is identified (e.g., by using the email address from which the bill notification email was sent, by using text in the bill notification email, etc.) and used to obtain the template corresponding to the biller. Based on the template, the location of the dynamic portions of the email are identified and the type of bill information (e.g., biller, amount, due date, etc.) in the locations are identified. Thus, from the identified locations, the bill information is extracted and each component of the bill information is associated with the corresponding type of bill information.

Alternatively or additionally, the bill payment widget may gather the bill information based on a user configuration. For example, the user may pre-configure the bill payment widget to identify a particular biller based on the sender of the email, the subject of the email, or other information. The user may also generate a rule for a particular biller that specifies which portions of an email correspond to bill information. Thus, the bill payment widget may use the user provided data to extract bill information.

In Step 207, a determination is made whether sufficient bill information exists in the email in one or more embodiments of the invention. If the email is an irrelevant email, then sufficient bill information does not exist in the email. In one or more embodiments of the invention, the amount of bill information is a function of the amount of pre-email existing information that the bill payment service or the bill payment widget has. For example, if the bill payment widget or the bill payment service is preconfigured with the user's account number of the user's account managed by the biller, then sufficient bill information may include only a payment due date, an amount, and an identifier of the biller. Similarly, for reoccurring payments, the payment due date may not be required when the bill payment service or bill payment widget is pre-configured with the day in the month in which the bill is due. If sufficient information does not exist in the email, then the email is ignored in accordance with one or more embodiments of the invention.

In Step 209, the user financial account is identified in one or more embodiments of the invention. Specifically, an identifier that uniquely identifies the user to the financial institution payment system is obtained. The identifier may be a financial account number, an email address associated with the user, a user identifier, or any other information that may be used to uniquely identify the user.

In Step 211, a determination is made whether to automatically sending the bill information to the bill payment service is enabled. The automatically sending to the bill payment service may be enabled, for example, when the bill payment service gathers bill information or when automatic payment mode is enabled. For example, automatic payment mode may be enabled when, in order to ensure that the payment is timely performed, the user wants the bill payment service to pay the bill without the user confirming that the bill is correct. As another example, the user may want to a list of bills, gathered based on the email notifications, through an interface provided by the bill payment service. In such example, the user may view all bills at once.

In Step 213, if a determination is made to automatically send the bill information to the bill payment service, then the bill information is sent to the bill payment service. For example, the bill information may be sent by sending an email with the bill information in a pre-defined format to the bill payment service with the identifier of the user financial account. As another example, the bill payment widget may send a network protocol request to the bill payment service. In the example, sending the network protocol request may be in the form of an HTTP post, generating and sending a file via file transfer protocol, or performing any other action to automatically, and without user intervention, send the bill information to the bill payment service.

In Step 215, if a determination is made not to automatically send the bill payment information, then a network protocol request is generated that includes the bill information. In one or more embodiments of the invention, the generated network protocol address may include a uniform resource locator (URL). The domain in the URL may be the domain of the financial institution or the financial institution. Further, the URL may include a user identifier and an identifier of the bill payment service in one or more embodiments of the invention. The network protocol request payload may include bill information, such as the payment amount, the due date, biller identifier, and any other bill information in one or more embodiments of the invention.

In Step 217, the bill notification email is augmented with a selectable interface component having the network protocol request to create a modified bill notification email. Augmenting the bill notification email may include embedding the selectable interface component in the body of the bill notification email in one or more embodiments of the invention. Alternatively or additionally, the selectable interface component may be added or enabled to be presented next to the email in the graphical user interface of the email application. For example, the selectable interface component may be a GUI button, the URL, or any other feature that the user may select. After the bill notification email is augmented with the selectable interface component, the user may view the email.

Figure 3:
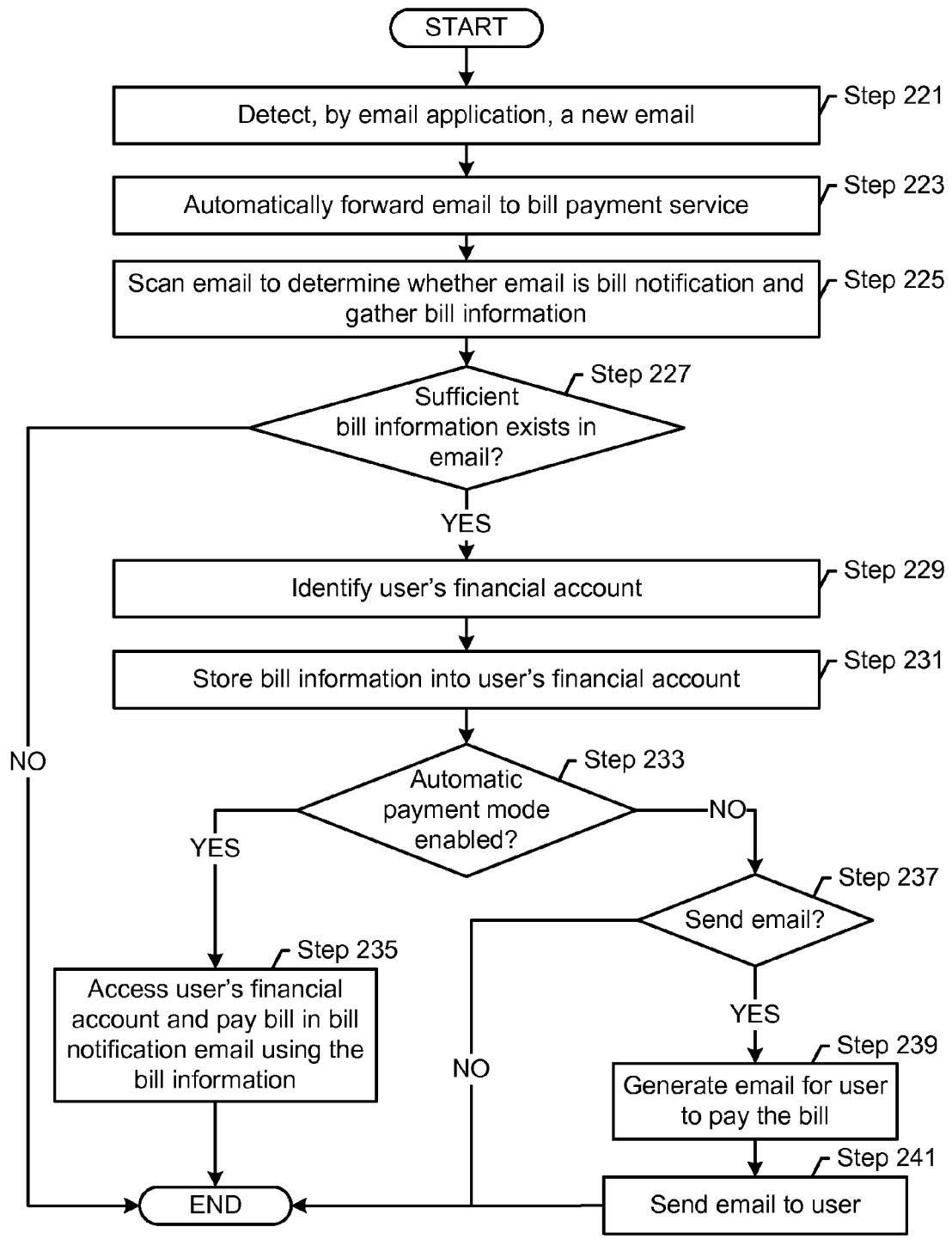

FIG. 3 shows a flowchart for the auto-forward widget to automatically forward the email to the bill payment service and for the bill payment service to pay the email. In Step 221, the email application detects a new email. Detecting a new email may be performed as discussed above with reference to Step 203 of FIG. 2.

Based on the new email, the auto-forwarding widget is started in one or more embodiments of the invention. In Step 223, the auto-forward widget automatically forwards the email to the bill payment service. Specifically, the auto-forward widget forwards the email to an email address accessible by the bill payment service. The forwarded email includes an identifier of the user. For example, prior to forwarding the email, the auto-forward widget may add the user identifier to the body or subject of the email. As another example, the email address used to forward the email may be an email address uniquely associated with the user. In other words, each user for which the bill payment service pays bills may have a unique email address for an email account accessible by the bill payment service. Thus, emails are forwarded with the "to" field as the unique email address of the corresponding user. As another example, the user identifier may be gathered from the body of the email referring to the previous email.

In Step 225, the email is scanned to determine whether the email is a bill notification and to gather the bill information from the email. Scanning the email may be performed as discussed above with reference to Step 205 of FIG. 2. Continuing with FIG. 2, a determination is made whether sufficient information exists in the email. Determining whether sufficient information is in the email may be performed as discussed above with reference to Step 207 in FIG. 2. In FIG. 3, Steps 225 and 227 may be performed by the bill payment service or the auto-forward widget. For example, the auto-forward widget may be configured to scan the email and only forward emails with sufficient bill information.

Continuing with FIG. 3, in Step 229, once the bill payment service receives the email, the bill payment service identifies the user's financial account corresponding to the bill. As discussed above, the user financial account may be identified from a component of the email. For example, a user financial account identifier may be in the email address of the "to" or "from" fields of the email, in the body of the email, etc. Based on the user financial account identifier, in Step 231, the bill information is stored in the user's financial account. Thus, the user may access the bill information from their financial account. Further, because the bill information is automatically obtained from the email, embodiments of the invention reduce user-error by the user typing in their bill information.

In Step 233, a determination is made whether automatic payment mode is enabled in one or more embodiments of the invention. In one or more embodiments of the invention, automatic payment mode is a configurable parameter of the bill payment service. If automatic payment mode is enabled, then the bill payment service may access the user's financial account and pay the bill in the bill notification email using the bill information in Step 235. Specifically, the bill payment service schedules the bill for payment according to the user's preferences. For example, the bill payment service may set the scheduled date for payment as the due date, one or more days prior to the due date, immediately as specified by default user preferences.

If automatic payment mode is not enabled, then a determination may be made whether to send an email in Step 237. Specifically, the user may configure the bill payment service to send an email when new payments are available to be made. In Step 239, if a determination is made to generate an email, then an email is generated for the user. The email may include a selectable interface component that allows the user to access from their email account the bill payment service. Further, emails to the user from the bill payment service may be generated based on a predefined time frame (e.g., $1^{st}$ and $15^{th}$ day of each month, every other week, $5^{th}$ and $20^{th}$ of each month, etc.), when a certain number of bills are collected, or based on any other preference set by the user. Thus, a single email from the bill payment service may represent multiple bills. Further, in Step 241, the email is sent to the user.

Figure 4:
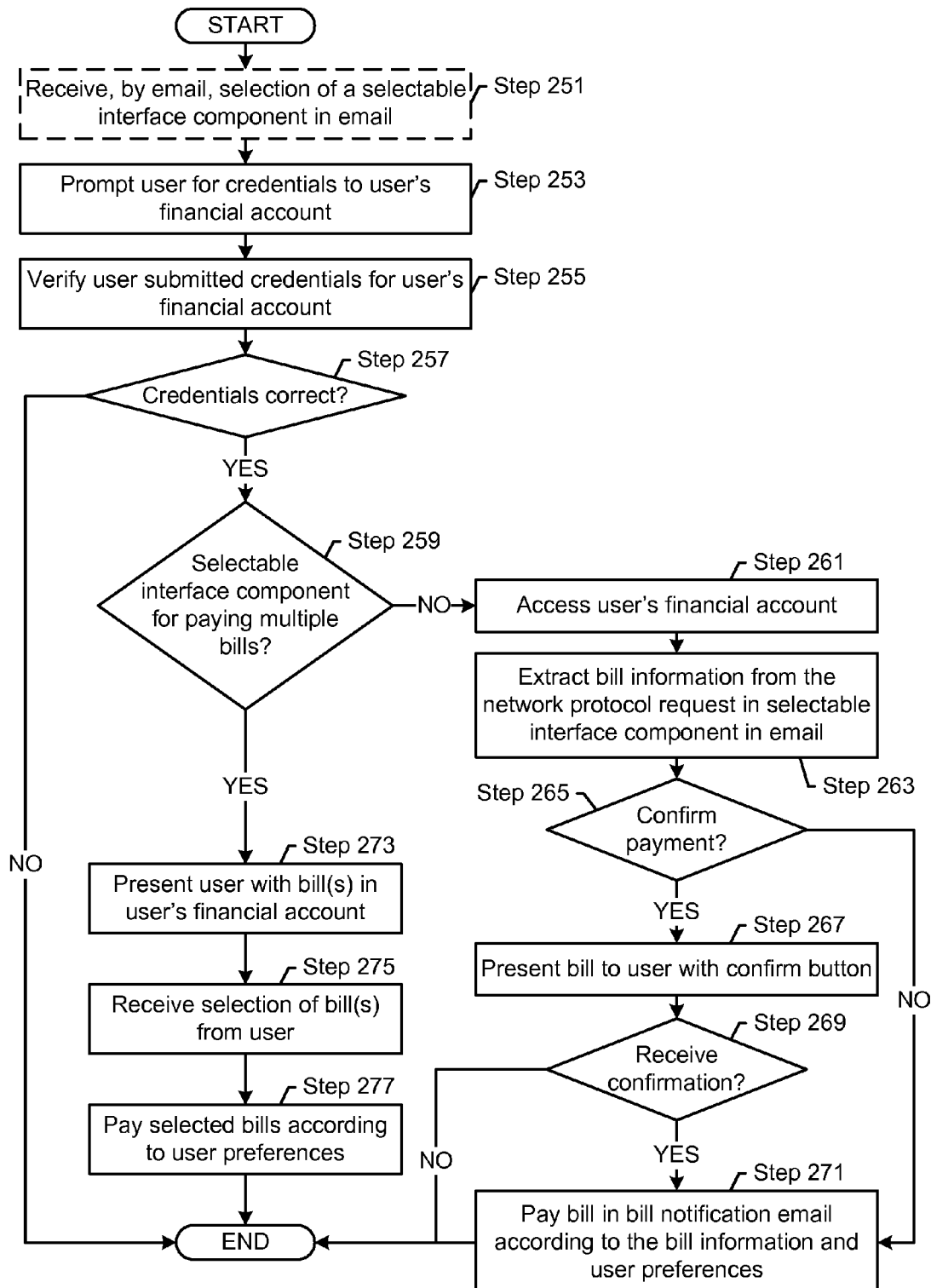

FIG. 4 shows a flowchart for paying a bill in one or more embodiments of the invention by the bill payment service. In Step 251, a selection of the selectable interface component is received in one or more embodiments of the invention. Specifically, the user selects the selectable interface component. The selection of the selectable interface component causes the issuance of the network protocol request in the selectable interface component. Accordingly, the bill payment service may receive the network protocol request. In one or more embodiments of the invention, rather than using the network protocol request, the user may log into their financial account without first accessing their email. In such scenario, the user directly accesses their account at the financial institution.

Regardless of whether the user directly accesses the account or accesses the account via the selectable interface component, the user is authenticated in one or more embodiments of the invention. In Step 253, the user is prompted for credentials to the user's financial account. The user's submitted credentials are verified using the stored credentials in the users' financial account in Step 255. In Step 257, a determination is made whether the credentials are correct. If the credentials are not correct then the user is denied access.

In Step 259, if the credentials are correct, then a determination is made whether the selectable interface component was for paying multiple bills. For example, the selectable interface component may be to pay multiple bills when the selectable interface component is generated by the bill payment service as discussed above with reference to in Step 239 of FIG. 3.

If the selectable interface component is not for paying multiple bills, then the user's financial account is accessed in Step 261. Further in Step 263, bill information is extracted from the network protocol request in the selectable interface component in the email. Because the bill information is in a pre-defined format, extracting the bill information may be performed by extracting the bill information from the fields of the network protocol request.

In Step 265, a determination is made whether the user needs to confirm payment in one or more embodiments of the invention. For example, the user may set a preference that once the user selects the selectable interface component, the payment may be automatically made after the user is authenticated. Optionally, however, the user may want to confirm the payment prior to the bill being paid. If the determination is made to confirm payment, then the bill is presented to the user with the confirm button. In Step 269, a determination is made whether the confirmation is received. If the confirmation is not received after presenting the user with the confirm button, then the bill is not paid.

In Step 271, if the confirmation is received or if a determination is made not to confirm the payment, then the bill payment service pays the bill in the bill notification email according to the bill information and the user preferences. Paying the bill may be performed as discussed above with reference to Step 235 in FIG. 3.

Returning to Step 259 in FIG. 4, if a determination is made that the selectable interface component is for paying multiple bills, then the user is presented with the bills in the user financial account in Step 273. Specifically, a list of bills is displayed for the user. The list of bills may include for each bill, a biller, an amount, and a due date. Each bill may also be associated with an input box, a selection box, or another input field for the user to request payment of the corresponding bill.

In Step 275, a selection of a bill is received from the user. For example, the user may select the input fields associated with various bills and then select a submit button. In addition to selecting the bills, the user may provide non-default preferences for paying the bill. For example, the non-default preferences may include the financial account to pay the bill, the mode to pay the bill, the amount, and the payment date. Based on the selection, the bills are paid according to the user preferences. Paying the bills may be performed as discussed above with reference to Step 235 in FIG. 3.

After one or more bills are set for payment, a confirmation may be generated and displayed to the user. The confirmation may include, for each bill paid, a biller identifier, the amount paid, the payment date, and the mode of payment.

Figure 5:
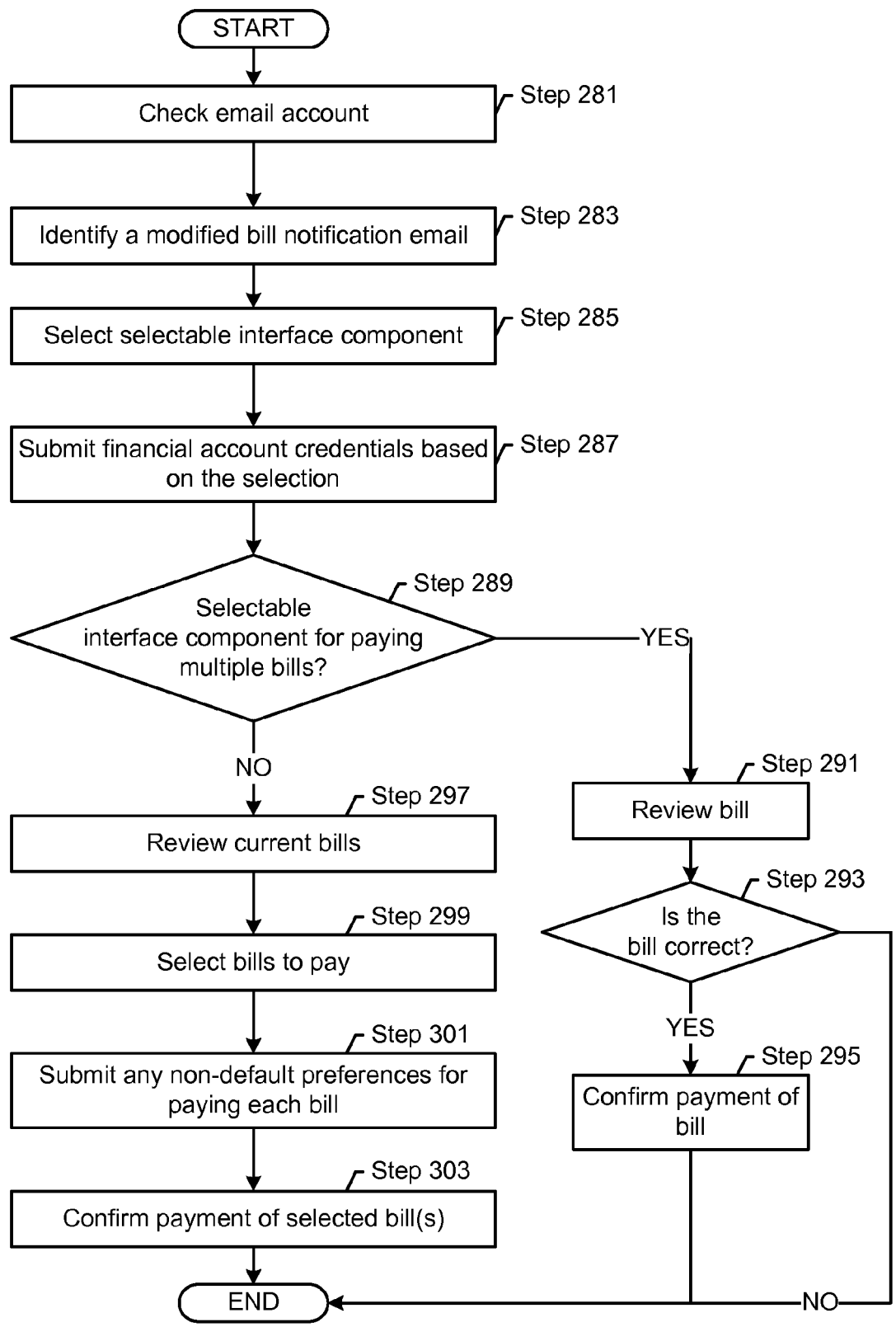

FIG. 5 shows a flowchart from a user perspective to pay a bill in one or more embodiments of the invention. In Step 281, the user checks their email account in one or more embodiments of the invention. Specifically, the user may present their email account credentials and view new email messages in their email.

In Step 283, the user identifies a modified bill notification email in one or more embodiments of the invention. As discussed above, the modified bill notification email includes a selectable interface component. Specifically, to the user, the modified bill notification email appears as the bill notification email with the additional selectable user interface component. By including the additional selectable user interface component, the user is provided with an easy method to initiate payment of the bill from the user financial institution. Thus, the selectable interface component provides the user with an added convenience to pay the bill. Thus, the user may view the bill notification email and decide whether to initiate payment of the bill.

In Step 287, after deciding to initiate payment, the user selects the selectable interface component in one or more embodiments of the invention. Selecting the selectable interface component results in the user being guided to the bill payment service. In Step 287, the user is prompted based on the selection, and the user submits financial account credentials. Once the user submitted correct financial account credentials, the user may access their financial account.

In Step 289, a determination is made whether the selectable interface component is for paying multiple bills. If the selectable interface component is to pay a single bill, then the single bill is displayed for the user. In Step 291, the user reviews the bill. At this stage, the user may determine whether the bill is correct in Step 293. For example, the user may confirm that the amount of the bill is in accordance with any user agreement with the biller, the identifier of the biller is correct, and that other information for paying the bill is correct. In Step 295, if the bill is correct, then the user confirms payment of the bill. Specifically, the user selects a button confirming payment. If the bill is not correct, then the user may ignore the bill or elect to remove the bill from the user financial account in one or more embodiments of the invention.

Returning to Step 289, if the selectable interface component is for paying multiple bills or if the user accesses the financial account directly without first accessing the user's email account, then the user reviews the current bills in Step 297. Specifically, the current bills are displayed for the user. The user may check each bill for accuracy and decide which bills to pay. In Step 299, the user selects the bills to pay. Further, the user may submit any non-default preferences for paying each bill in Step 301. After selecting the bills and submitting non-default preferences, the user confirms payment of the selected bills in Step 303.

FIGS. 6A-E show an example in accordance with one or more embodiments of the invention. The following example is for explanatory purposes only and not intended to limit the scope of the invention.

FIG. 6A shows an example bill notification email (400) from a biller in one or more embodiments of the invention. As shown in the example bill notification email (400), the bill notification is in a natural language prose format. The descriptive format used by the biller has each sentence having a component of the bill information. For example, the first line provides the account number, "9-99-999-9999." The first sentence states that the biller is an SCE customer. Accordingly, a bill payment widget may extract from the first sentence the biller identifier of SCE. The bill payment widget may extract from the second sentence the payment amount of "$356.77" based on the phrase "total amount due" and an adjacent "$" sign in the sentence. Finally, the bill payment widget may extract the date of "09/13/2010" as being the due date based on the words, "past due," being in the same sentence.

In addition to the bill information, the bill notification email (400) may also include extraneous elements such as a link to the user's biller account. If the user selects the link in the bill notification email (400), then the user must pay each bill separately and remember the account credentials of each account managed by each of the user's biller.

FIG. 6B shows a modified bill notification email (402) created by the bill payment widget in one or more embodiments of the invention. As shown in FIG. 6B, the bill payment widget embeds the selectable interface component (404) into the bill notification email (400 of FIG. 4A) in order to create the modified bill notification email (402). In other words, the remainder of the bill notification email remains the same in the modified bill notification email (402). In the example, the selectable interface component (404) is a button that with the phrase, "Pay this Bill." Thus, the user may select the selectable interface component (404) to be guided to the user's financial account. Also, as shown in the modified bill notification email, the remainder of the bill remains the same.

In the example, the selectable interface component includes a network protocol request. Specifically, the bill payment widget may include as part of the selectable interface component the URL:

http://services.banking.mybank.com/{customerId}/bill-Payment

In the above URL, services.banking.mybank.com is a domain for the financial institution, {customerId} is a unique identifier for the financial institution to identify the customer, and billPayment is the location of the bill payment service. In addition to the above, the bill information (payee=SCE, bill amount=$356.77, and due date=09/13/2010) is added to the payload of the network protocol request. Thus, as shown in the example, the information required to pay the bill is a part of the network protocol request.

Continuing with the example, consider the scenario in which the user selects the selectable interface component. FIG. 6C may show an example authentication interface (410) that the user views after selecting the selectable interface component. The authentication interface (410) allows the financial institution to verify the identity of the user. In the authentication interface, the user provides the UserID, "John Smith", a password, and selects the Logon button.

If the user credentials are correct, then the bill payment service presents the user with the bill and the payment parameters as shown in FIG. 6D. Specifically, FIG. 6D, shows a single bill interface (412) presented to the user when the user selects a selectable interface component from a modified bill notification email and correctly submits the user's authentication credentials. As shown in the example, the user may view the payee, the due date, and the payment amount. Further, in one or more embodiments of the invention, the user may change any of the components. For example, the user may decide to only pay part of the billed amount or pay the bill on a different date. After reviewing the bill, the user selects the confirm button to confirm payment of the bill in the single bill interface (412). Upon receiving the selection of the confirm button, the bill payment service schedules payment of the bill.

Alternatively, rather than using a modified bill notification email, the user may use a selectable interface component embedded in an email from the bill payment service, or view the list of bills when the user directly accesses their financial account. In FIG. 6E shows a list of bills interface (414) for the user to view a list of bills. Similar to the single bill interface (412) for a single bill, the user may view a payee, a due date, and an amount for each bill. After reviewing the bills, the user may select a confirmation button to confirm payment of the bills. Upon receiving the selection of the confirm button, the bill payment service schedules payment of the bill.

As shown in the above example, bill information is automatically routed to the user's financial account. Thus, the user may pay their bills from their financial account without having to enter the bill information or go to each biller's account. Thus, in one or more embodiments of the invention, the user does not need to remember their account credentials for each billers account in order to pay a bill. Further, by making bill payment more convenient, embodiments of the invention assist the user in paying bills on time.

Figure 7:
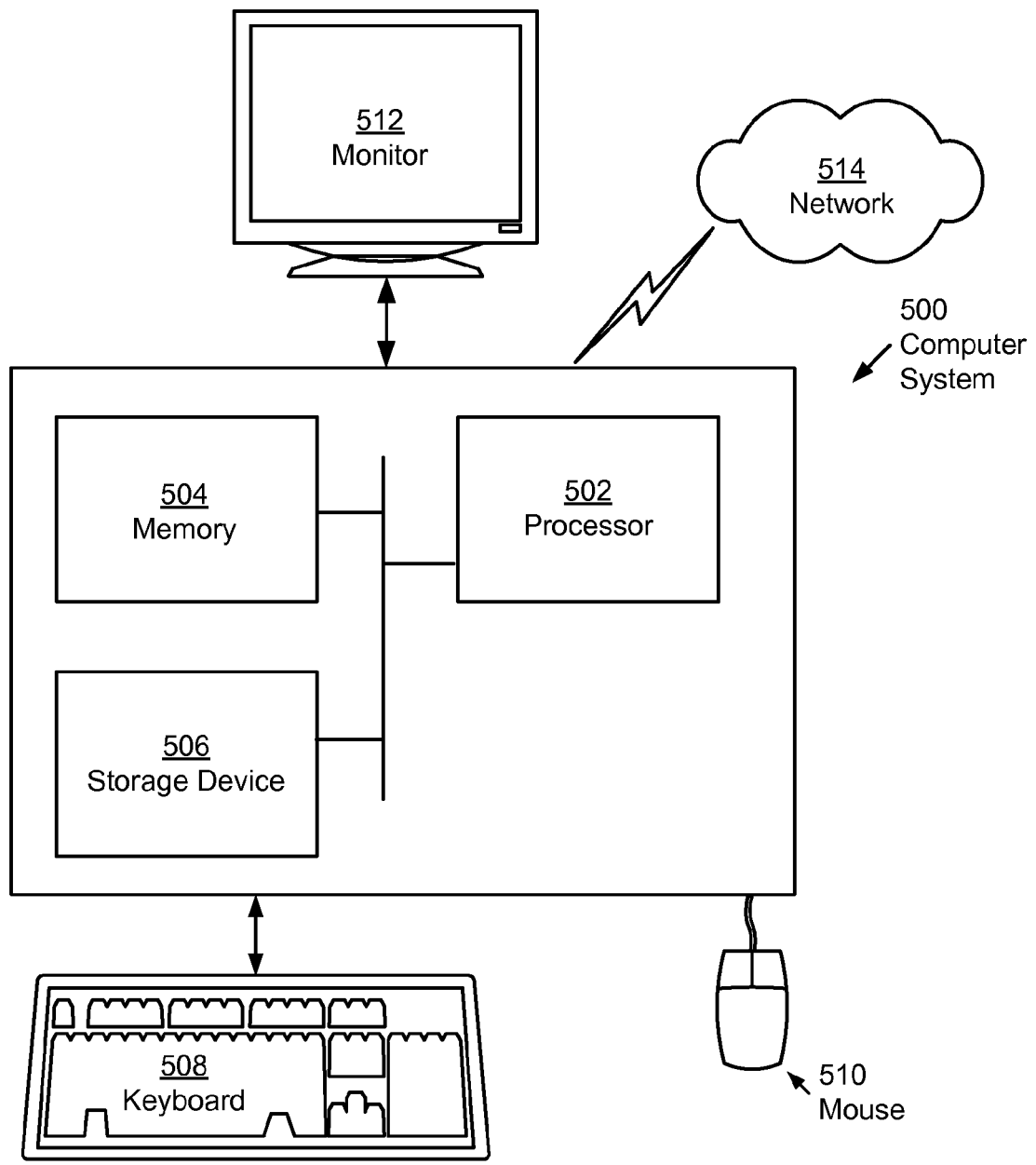
FIG. 7 shows a computer system in accordance with one or more embodiments of the invention.

Embodiments of the invention may be implemented on virtually any type of computer regardless of the platform being used. For example, as shown in FIG. 7, a computer system (500) includes one or more processor(s) (502) such as an integrated circuit, a central processing unit (CPU) or other hardware processor(s), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., data repository, bill payment service, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for paying a bill, comprising:
   intercepting, by an email application, a bill notification email from a financial institution payment system to a user;
   scanning, by a computer processor, the bill notification email to gather, from the bill notification email, bill information comprising a billed amount and a biller identifier, wherein scanning the bill notification email comprises identifying the billed amount based on the billed amount being adjacent to a keyword in the bill notification email and identifying the biller identifier based on the biller identifier in the bill notification email matching a biller in a list of billers;
   generating, by the computer processor, a network protocol request referencing a bill payment service, wherein the network protocol request comprises the bill information;
   augmenting, by the computer processor, the bill notification email with a graphical user interface (GUI) button to create a modified bill notification email, wherein the GUI button comprises the network protocol request with the bill information;
   presenting the modified bill notification email to the user;
   receiving a selection of the GUI button;
   extracting, by the bill payment service, the bill information from the network protocol request based on the selection to obtain extracted bill information; and
   paying the bill using the extracted bill information by paying the billed amount to the biller identified by the biller identifier using a financial account of the user.

2. The method of claim 1, wherein the network protocol request is a hypertext transfer protocol (HTTP) request.

3. The method of claim 1, further comprising:
   prompting the user for financial account credentials to access the financial account based on the selection of the GUI button; and
   verifying the financial account credentials submitted by the user.

4. The method of claim 1, wherein the selection of the GUI button is to confirm paying the bill, and wherein the bill is immediately paid based on the selection.

5. The method of claim 1, wherein the bill information further comprises a due date.

6. The method of claim 5, wherein paying the bill comprises scheduling the payment of the bill from a financial account of the user prior to the due date.

7. A system for paying a bill, comprising:
   a computer processor;
   a data repository comprising a financial account for a user; and
   a bill payment widget executing on the computer processor and configured to:
      intercept a bill notification email from a financial institution payment system to a user;
      scan the bill notification email to gather, from the bill notification email, bill information referencing a bill payment service and comprising a billed amount and a biller identifier, wherein scanning the bill notification email comprises identifying the billed amount based on the billed amount being adjacent to a keyword in the bill notification email and identifying the biller identifier based on the biller identifier in the bill notification email matching a biller in a list of billers;
      generate a network protocol request comprising the bill information;
      augment the bill notification email with a graphical user interface (GUI) button to create a modified bill notification email, wherein the GUI button comprises the network protocol request with the bill information; and
      present the modified bill notification email to the user,
   wherein the bill is paid by the bill payment service using the financial account based on a selection of the GUI button in the modified bill notification email.

8. The system of claim 7, wherein the network protocol request is a hypertext transfer protocol (HTTP) request.

9. The system of claim 7, further comprising:
   the bill payment service configured to:
      extract the bill information from the network protocol request based on the selection of the GUI button to obtain extracted bill information; and
      pay the bill using the extracted bill information by paying the billed amount to the biller identified by the biller identifier using the financial account of the user.

10. The system of claim 7, wherein the bill payment account comprises bill payment account credentials, and wherein the system further comprises:
    the bill payment service configured to:
       prompt the user for the financial account credentials to access the financial account based on the selection of the GUI button; and
       verify the financial account credentials submitted by the user.

11. The system of claim 7, wherein the selection of the GUI button is to confirm paying the bill, and wherein the bill is immediately paid based on the selection.

12. The system of claim 7, wherein the bill information comprises an amount of the bill, an identifier of a biller, and a due date.

13. The system of claim 12, wherein paying the bill comprises scheduling the payment of the bill from a financial account of the user prior to the due date.

14. A non-transitory computer readable storage medium comprising computer readable program code embodied therein for causing a computer system to:
    intercept a bill notification email from a financial institution directed to a user;
    scan the bill notification email to gather, from the bill notification email, bill information comprising a billed amount and a biller identifier, wherein scanning the bill notification email comprises identifying the billed amount based on the billed amount being adjacent to a keyword in the bill notification email and identifying the biller identifier based on the biller identifier in the bill notification email matching a biller in a list of billers;
    generate a network protocol request referencing a bill payment service, wherein the network protocol request comprises the bill information;
    augment the bill notification email with a graphical user interface (GUI) button to create a modified bill notification email, wherein the GUI button comprises the network protocol request with the bill information; and
    present the modified bill notification email to the user,
    wherein, according to a selection of the GUI button selectable interface component, the bill is paid by the bill payment service by paying the billed amount to the biller identified by the biller identifier using a financial account of the user.

15. The non-transitory computer readable storage medium of claim 14, wherein the network protocol request is a hypertext transfer protocol (HTTP) request.

16. The non-transitory computer readable storage medium of claim 14, wherein the computer readable program code further causes the computer system to:
   prompt the user for financial account credentials to access the financial account based on the selection of the GUI button; and
   verifying the financial account credentials submitted by the user.

17. The non-transitory computer readable storage medium of claim 14, wherein the selection of the GUI button is to confirm paying the bill, and wherein the bill is immediately paid based on the selection.

18. The non-transitory computer readable storage medium of claim 14, wherein the bill information comprises a due date.

19. The non-transitory computer readable storage medium of claim 18, wherein paying the bill comprises scheduling the payment of the bill from a financial account of the user prior to the due date.

* * * * *